United States Patent [19]
Ledoux et al.

[11] Patent Number: 5,342,570
[45] Date of Patent: Aug. 30, 1994

[54] METHOD AND APPARATUS FOR DEFORMING REFORMABLE TUBULAR PIPE LINERS

[75] Inventors: Patrick R. Ledoux; Luc R. Fourgaut, both of New Orleans, La.

[73] Assignee: Pipe Liners, Inc., St. Rose, La.

[21] Appl. No.: 564,708

[22] Filed: Aug. 9, 1990

Related U.S. Application Data

[60] Continuation of Ser. No. 389,693, Aug. 4, 1989, abandoned, which is a division of Ser. No. 77,883, Jul. 27, 1987, Pat. No. 4,863,365.

[51] Int. Cl.⁵ .............................. B29C 49/26
[52] U.S. Cl. .................... 264/566; 156/287; 264/209.3; 264/516; 264/568; 264/230; 264/269; 264/285; 264/339; 264/348; 425/72.1; 425/326.1; 425/327; 425/392
[58] Field of Search .............. 264/568, 566, 339, 348, 264/285, 230, 516, 269, 209.3; 425/71, 72.1, 326.1, 392, 327; 156/287

[56] References Cited

U.S. PATENT DOCUMENTS

| | | | |
|---|---|---|---|
| 2,399,422 | 4/1946 | Back | 264/348 |
| 2,423,260 | 7/1947 | Slaughter | 425/326.1 |
| 2,980,161 | 4/1961 | Howard | 264/285 |
| 3,543,334 | 12/1970 | Sudo | 425/71 |
| 3,897,530 | 7/1975 | Leathers | 264/285 |
| 4,020,136 | 4/1977 | Zaro | 264/568 |
| 4,207,130 | 6/1980 | Barber | 264/285 |
| 4,863,365 | 9/1989 | Ledoux et al. | 425/392 |
| 4,867,921 | 9/1989 | Steketee, Jr. | 264/36 |

FOREIGN PATENT DOCUMENTS

| | | |
|---|---|---|
| 0098547 | 1/1984 | European Pat. Off. |
| 2487702 | 2/1982 | France |
| 2503622 | 10/1982 | France |
| 536703 | 6/1973 | Switzerland |
| 275964 | 3/1928 | United Kingdom |

*Primary Examiner*—Jeffery Thurlow
*Attorney, Agent, or Firm*—Nixon & Vanderhye

[57] ABSTRACT

A method producing deformed pipe liners from continuously extruded thermoplastic material by collapsing and bending deformable portions of the tube toward a back-up portion thereof and without elongation to maintain diameter and wall thickness, and apparatus to carry out said method and characterized by at least one back-up roller and at least one shaping roller folding the deformable portion along a line of symmetry and juxtaposing a fold of the tube to the back-up portion, all at raised temperature followed by reduced temperature on a rail conforming to the deformed tube configuration.

20 Claims, 5 Drawing Sheets

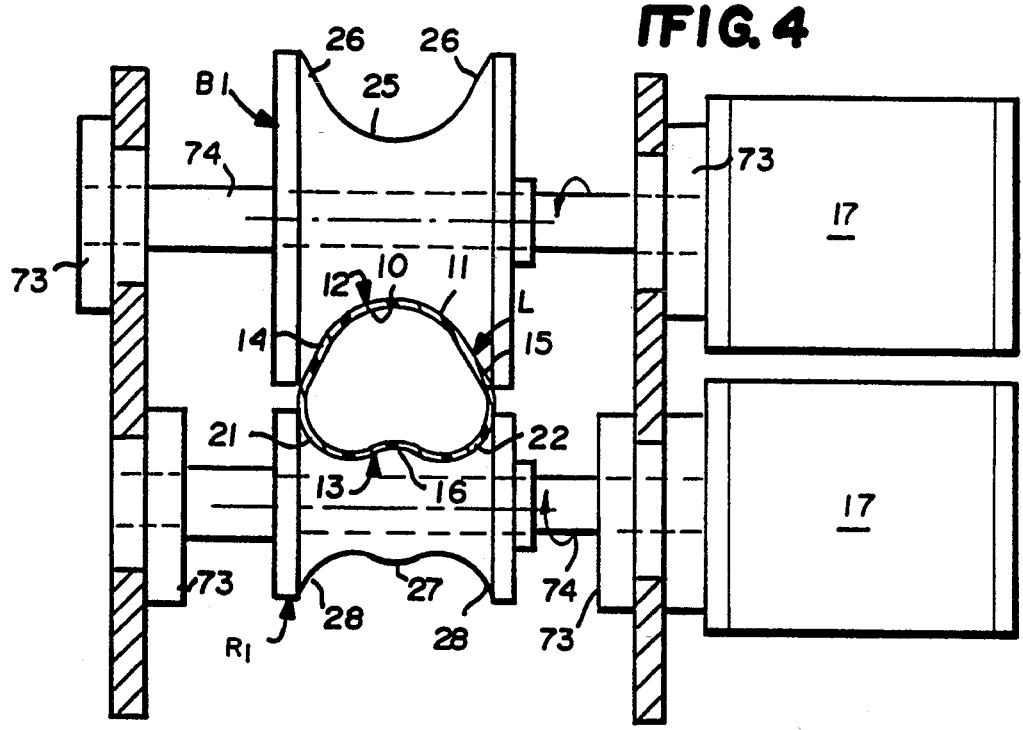
FIG. 4
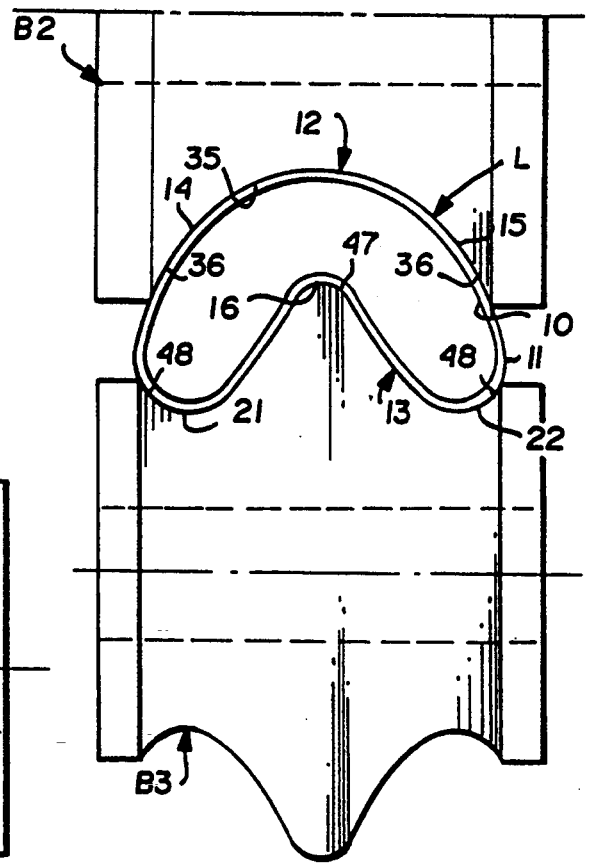
FIG. 6
FIG. 5

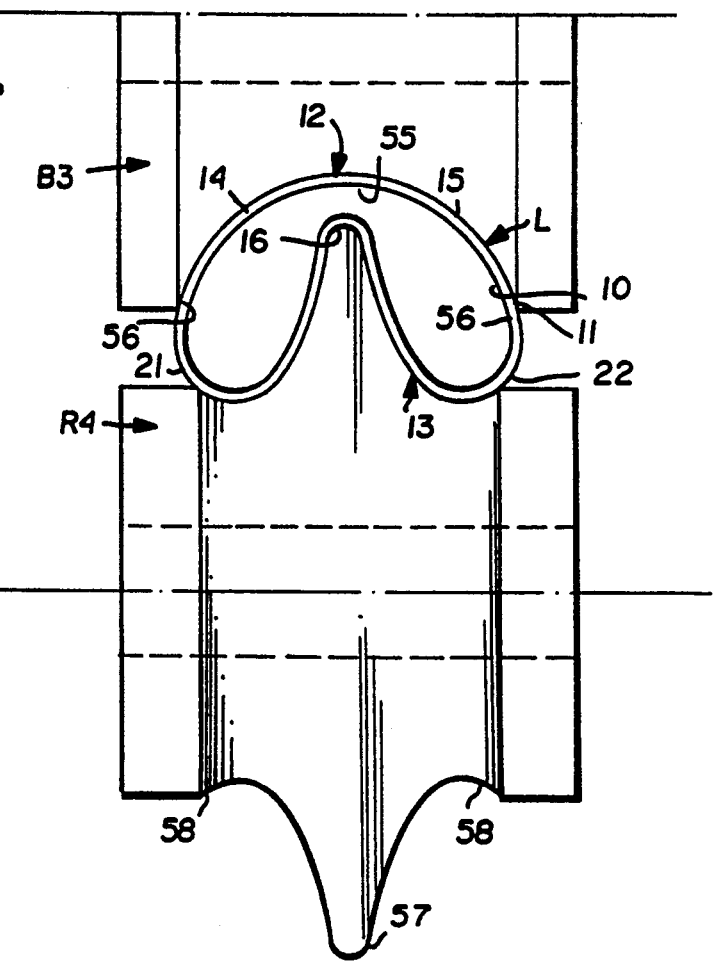
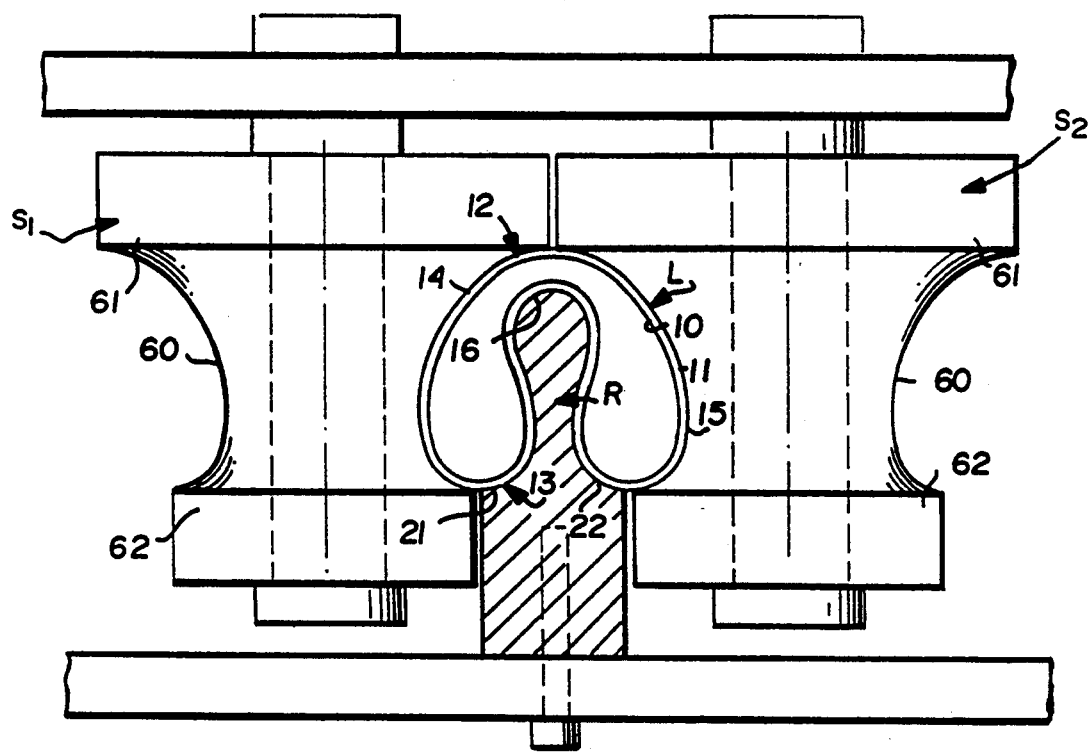

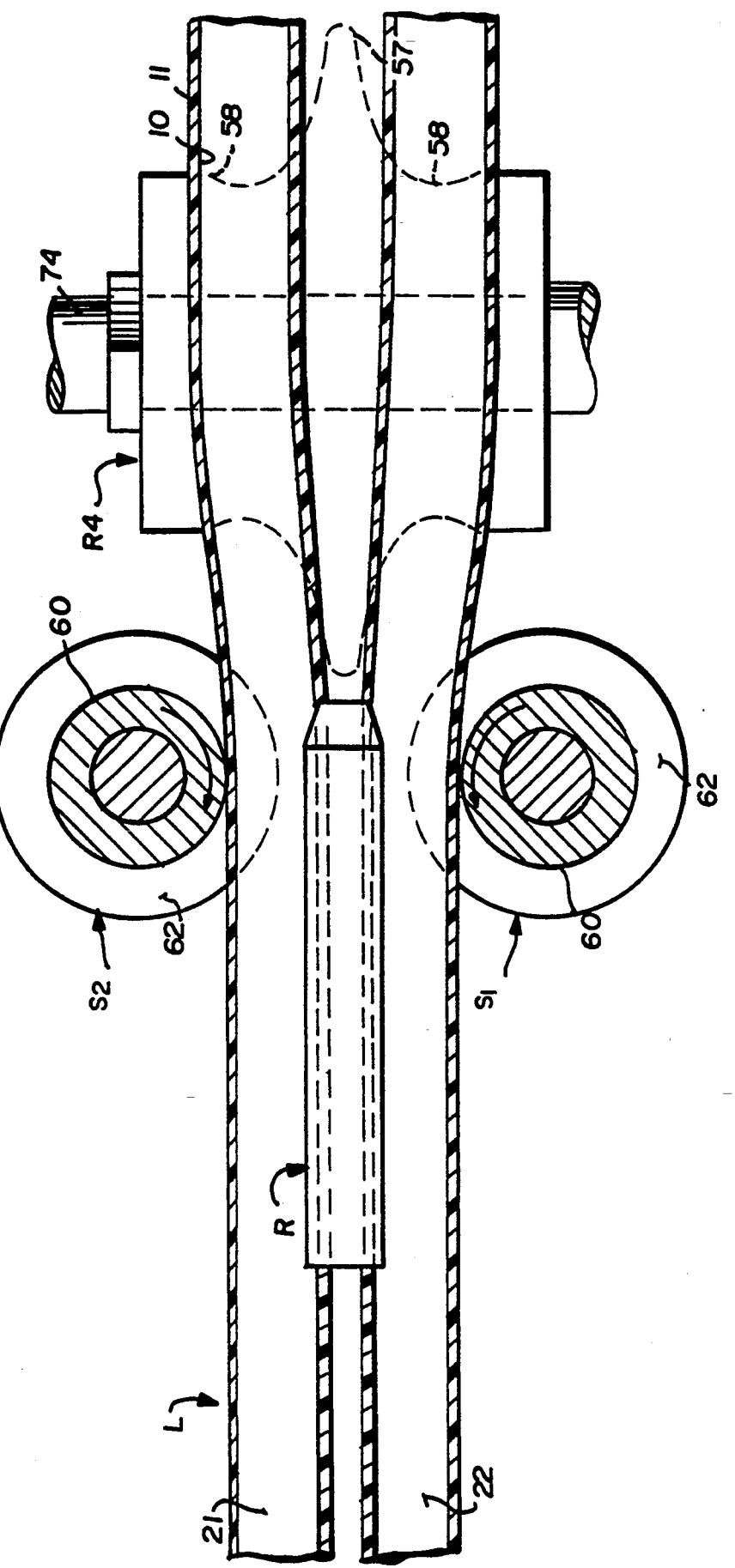

METHOD AND APPARATUS FOR DEFORMING REFORMABLE TUBULAR PIPE LINERS

This is a continuation of application Ser. No. 07/389,693, filed Aug. 4, 1989, now abandoned, which, in turn, is a division of application Ser. No. 07/077,883, filed Jul. 27, 1987 for "Method and Apparatus for Deforming Reformable Tubular Pipe Liners," now U.S. Pat. No. 4,863,365, dated Sep. 5, 1989.

BACKGROUND AND SUMMARY OF THE INVENTION

This invention relates to the use of thermoplastic liners within pipe lines, either initially or as a repair. In the case of new piping, the liner will protect the internal walls from deterioration, and the liner can be replaced from time to time. In the case of deteriorated or damaged piping, the liner will restore the fluid transporting capability of the piping and will prevent further interior deterioration. The use of such a liner for protecting the interior of pipe is taught by Dr. Jacques Laurent in French Patent No. 2,503,622 dated October, 1982 in which he teaches the concept of heat transfer and deformation of previously extruded cylindrical tube of thermoplastic material into U-shape cross-section for insertion into and subsequent reshaping to its original extruded form within pipe as a protective liner. It is a general object of this invention to provide a method and apparatus for the manufacture of the deformed tube product useful as pipe liners of the type disclosed in the Laurent patent.

In its broad sense, this method of manufacturing a deformed tube product involves a first step of extruding a tube cross-section as required for use as a pipe liner, and a second step of deforming the extruded tube into a reduced cross-section for insertion into a pipe as a liner therefor. A feature of this method of manufacturing a tube product is the use of thermoplastic material and its temperature control at the successive stages of formation, during extrusion into its initial and subsequent form, during its deformation, and during its return to ambient usable condition. It is an object of this invention to provide a method and apparatus for the manufacture of pipe liners in continuous deformed lengths which are then subsequently returned to their original unstressed extruded cross-section after insertion into the pipe to be protected thereby. In practice, the liner configuration has an outside diameter equal to or slightly greater than the inside diameter of the pipe to be protected, whereby the said liner is either unstressed or under slight circumferential compression; either of which conditions is readily accommodated by the plastic liner which relies upon the surrounding pipe for its structural support.

The first step of this process, that is the extrusion of a tubular cross-section, is state-of-the-art. However, the second step of this process, that is the deformation of the extruded tube into a reduced cross-section, is novel. It is an object of this invention to deform an initially extruded tubular cross-section without adverse effect on its structural integrity, and in such a manner that its initially extruded tubular cross-section can be restored. To this end, controlled heat is applied to establish a softened condition of the thermoplastic material after its extrusion, while simultaneously applying deforming tools thereto in order to reduce its cross-sectional configuration. When the desired reduction is achieved, heat is withdrawn from what is the finished product of continuous length that is then stored on spools for storage, transport and subsequent installation.

This invention is particularly concerned with the second broad step referred to above, which broad step is reduced into smaller secondary steps, so to speak. The following disclosure will concentrate primarily upon these smaller steps with respect to the method and apparatus provided herein to perform said steps and their functions. For example, a U-shaped reduced tubular configuration is shown and described. However, it is to be understood that a V-shaped reduced tubular configuration is essentially the same as the U-shape, except for its acute angle as distinguished from roundness. Also, it is to be understood that other cross-sectional reductions are essentially the same, whether they be H-shaped or X-shaped, or the like; the H-shape being two U's round to round, and the X-shape being four V's angle to angle. The U-shape, or V-shape, is presently considered to be the most practical and preferred configuration for such a tube product.

In carrying out this invention, the deformation of the initially extruded tube, preferably of cylinder form, progresses in a gradual manner, by shaping means. That is, at least one side of the tubular extrusion is increasingly depressed so as to condition the tubular extrusion for its lateral collapse into a reduced U-shaped, or V-shaped, cross-sectional form; thus providing a deformed tube. As pointed out above, the aforesaid deformation is conducted in the presence of controlled heat substantially below fluidity of the thermoplastic material and such that such plastic is deformed without adversely affecting its structural integrity, whether in its deformed condition or in its subsequently re-established initial condition. It is an object of this invention to provide shaping means, preferably in the form of rollers, to deform the initially extruded tube as stated. In practice, the deformation is gradual, step-by-step, utilizing combined pairs of opposed shaping rollers. A feature is the lateral collapse of the tubular extrusion over a forming rail, by means of opposed shaping rollers that embrace such forming rail. The finished product is then cooled to ambient temperature during and/or upon its delivery from the forming rail, as by means of a cooling trough. Heating and cooling is by means of heat absorption or radiant heating, and preferably by temperature controlled water baths or spray.

The present-day commercial demand for this pipe liner is a product ranging from 2 inches to 24 inches in diameter. The wall thickness will vary in proportion to diameter as circumstances require, depending upon the application involving internal pressure applied in use and strength required thereby. Accordingly, there will be variations in the process steps involving the plurality of shaping means disclosed herein as shaping rollers and back-up roller, whereby at least one side of the tubular extrusion is deformed as required. That is, the number of shaping means and the step-by-step degree of deformation is variable, depending upon the size and wall thickness and material to be deformed. A feature of this method and apparatus is that the product is pulled out of the extruder and from the deforming tool, for delivery to a storage spool, in a controlled manner, whereby the cross-sectional configuration of the deformed tube product is uniform and within specified dimensional tolerance. With respect to variations in size and tolerances, and especially with respect to larger diameter pipe liners, it is an object of this invention to provide pulling traction on the tube during its process of deformation, and applied to the shaping means, disclosed herein as powered rollers. In practice, torque is independently applied to the shaping and back-up rollers, so as to ensure uniform advance of the deforming tube product.

The product herein disclosed is a thermoplastic pipe liner that is reduced from its initially extruded cross-section so that it can be easily pulled inside a pipe line and then restored to its initially extruded cross-section. Assuming pipe to be round in cross-section, the outside diameter of the initially extruded and/or reformed liner tube is the same or slightly greater than the inside diameter of the pipe that receives it, so that the liner exterior comes into perfect interface contact with the pipe interior and preferably under slight circumferential compression. This interface contact of liner within the pipe eliminates any annulus, and so that the requirement of filling such an annulus is virtually eliminated. A feature of this liner is its thin-wall configuration made of a thermoplastic such as polyethylene, nylon, Teflon TM, ABS, or any other such plastic material, whereby the small loss of inside diameter of the flow passage is largely compensated for by the exceptional flow coefficient within the liner made of such a thermoplastic material. For new pipe line projects, extensive pipe materials such as stainless alloys can be substituted with ordinary steel pipe, and lined with this product liner, thereby realizing a cost saving of 1.5 to 2.2, together with the improved fluid tolerance properties of the plastic which can be selected to best advantage. Accordingly, pipe lines which are structurally sound need not be replaced, since this product liner can be installed and replaced as circumstances require.

The method and apparatus herein disclosed for the manufacture of this product liner involves the primary step of extruding thermoplastic tubing, and the secondary step of deforming the thermoplastic tubing. The primary step of extrusion involves generally, an extruder that receives raw plastic material and delivers a tubular cross-section through a vacuum trough that controls the processing temperature and precise configuration of the tubular cross-section. The secondary step of deforming the precise tubular cross-section involves generally, a multi-stage shaping tool that deforms the extrusion at controlled temperature and delivers it through a cooling trough as the finished product liner. The finished product liner is drawn from the secondary step by a puller that controls the linear speed of the production and maintains a constant wall thickness of the finished product liner.

These and further objects and advantages of the present invention will become more apparent upon reference to the following specification, appended claims and drawings.

BRIEF DESCRIPTION OF THE DRAWING FIGURES

Figure 3:
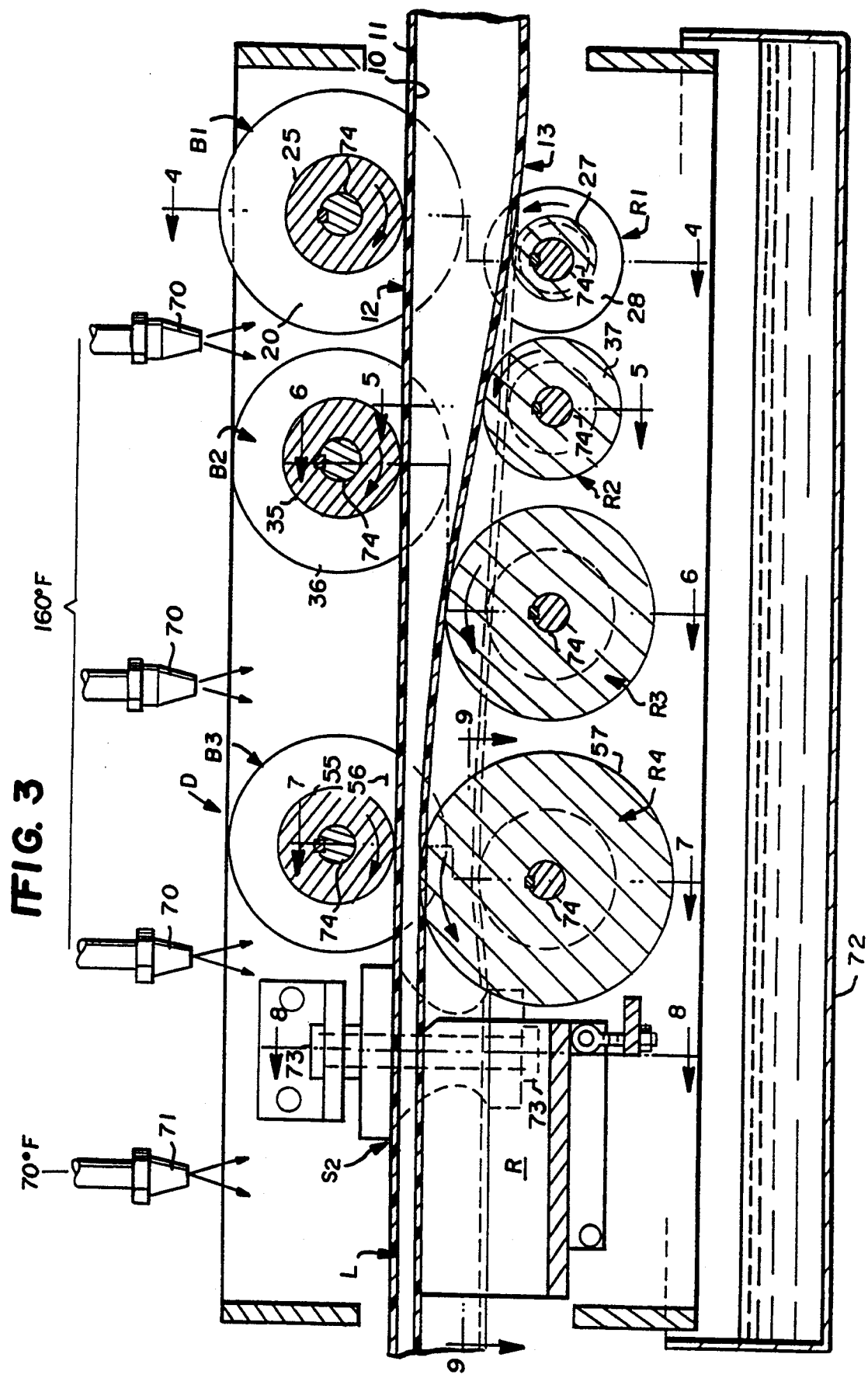

FIG. 3 is an enlarged longitudinal sectional view of the deformer apparatus which performs the method herein disclosed to deform extruded thermoplastic tubing; and FIGS. 4 through 9 are enlarged detailed sectional views taken substantially as indicated by lines 4—4, 5—5, 6—6, 7—7, 8—8 and 9—9 in FIG. 3.

DETAILED DESCRIPTION OF THE DRAWING FIGURES

Reference will now be made in detail to the present preferred embodiment of the invention, an example of which is illustrated in the accompanying drawings.

Referring now to the drawings, this invention is concerned with lining new and old pipe lines with a deformed tube that is pulled into the pipe line and then reformed to tightly fit therein. The tube can be made of any suitable material which will collapse and subsequently return to its original cross-section, and such a material is thermosetting plastic and within the subject matter of the aforementioned Laurent patent. In practice, the pipe liner is a thin-walled plastic sleeve extruded in continuous lengths and later inserted into pipe lines for internal protection, and for example to protect new pipe lines and to reconstitute deteriorated pipe lines as well.

Accordingly, the pipe liner L as it is disclosed herein is initially extruded so as to have an exterior diameter at least as large as the interior diameter of the pipe into which it is to be inserted, and preferably slightly in excess of said pipe diameter in order that the tubular pipe liner L is under slight circumferential compression when it is in operating position in the pipe line. A feature of this invention is the deformation of the tubular pipe liner L, to decrease its cross-section configuration for storage and to facilitate its insertion into a pipe line. That is, the original cylinder cross-section of the pipe liner L is collapsed and later restored, all without destroying its dimensional properties. Therefore, the circular configuration of the pipe liner L is not stretched, even though the material is plastic and subject to flow. In other words, the original cylindrical cross-section properties of the initially extruded pipe liner L is preserved in a deformed condition thereof which enables its insertion into pipe lines and for its subsequent reformation into its original cylindrical cross-section. The characteristic feature of this invention is that the initially extruded thermoplastic pipe liner L is collapsed and thereby deformed without elongation, whereby its dimensional properties necessary for restoration are retained.

Referring now to the deformation of pipe liner L as shown in FIGS. 2a through 2e of the drawings, the initially extruded configuration is cylindrical, having inner and outer diameter walls 10 and 11. As shown, there is an upper back-up section 12 and a lower deformable section 13. The deformation is bilaterally symmetrical and disposed about a vertical plane a of symmetry and about which the tube formation is collapsed by means of bending and folding. Accordingly, there are opposite side sections 14 and 15 which are established by center fold 16 that inverts the lower deformable section 13 upwardly into juxtaposed relation to the inside diameter 10 of the back-up section 12. Therefore, each side section is comprised of a side wall depending from top dead center of the tube form and bent inwardly so as to continue upwardly to the center fold 16. It is significant that the two side sections 14 and 15 are thereby collapsed into double-wall configurations which are further collapsed inwardly toward the center plane a of symmetry as clearly shown in FIG. 2e which is the desired product formation.

Figure 1:
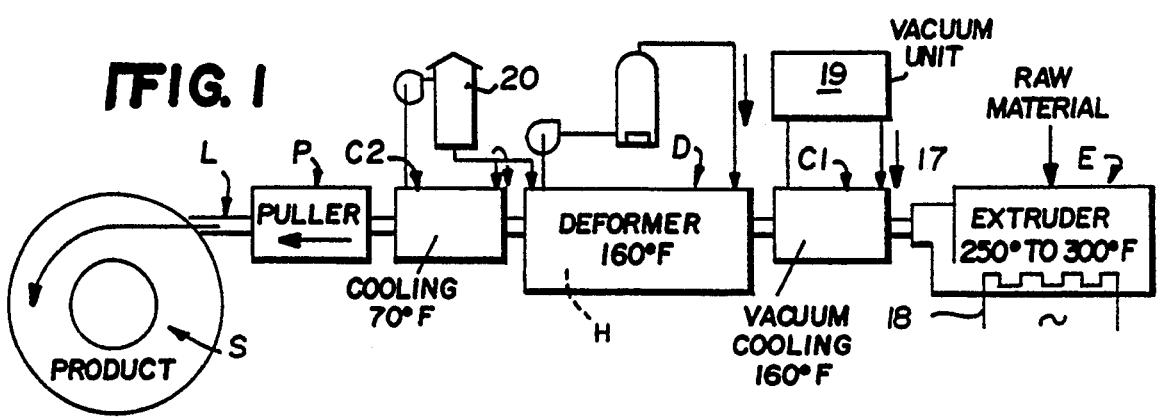
FIG. 1 is a block diagram illustrating the method of producing an extruded plastic pipe liner for restoration to its initially extruded cross-sectional configuration.

Referring now to FIG. 1 of the drawings, the entire method of tube formation and deformation is illustrated in its general form. As shown, there is an extruder means E followed by a cooling means C1 that delivers the tube form into a deformer apparatus D which performs the product deformation process. Following the deformation process, the product is then delivered through cooling means C2 so as to establish it at ambient temperature for delivery through a puller means P and onto a storage spool S or the like. The extruder means E is state-of-the-art and receives the raw thermoplastic material and forces it through an extrusion die 17 at, for example, 250° to 300° F. using heating means 18 to attain that temperature. The cooling means C1 is state-of-the-art, and preferably a vacuum cooling means supported by a vacuum cooling unit 19 and reducing the tube form temperature to, for example, 160° F. The deformer apparatus D is subjected to heat control means H that maintains the desired deformation temperature of, for example, 160° F. The cooling means C2 is state-of-the-art and reduces the tube form temperature to ambient, and it is supported, for example, by a cooling tower 20 or the like. The means C1 and C2 include pump means for water recirculation, and it is to be understood that the aforementioned temperatures can vary as circumstances require. And, the puller means P is also state-of-the-art and draws the finished deformed tube product from the preceding apparatus, its pulling force being controlled so as not to stretch or compress the tube form in the process of its deformation, and thereby controlling its wall thickness.

Referring now to the method or process of deforming a continuously extruded tube form of plastic material, the steps thereof are sequentially as follows: firstly, a cylindrical tube form is extruded as shown by phantom lines in FIGS. 2a through 2e, thereby established a uniform wall section, and preferably of cylindrical configuration. The top semi-circular portion, namely the back-up section 12, is supported and the fold 16 is impressed at bottom dead center of the tube form in alignment with the center plane of symmetry and progressing upwardly and into juxtaposed relation to the inside wall 10 of the tube form at top dead center thereof. In this process of deformation the opposite side sections 14 and 15 are turned and/or bent inwardly at their lower extremities 21 and 22, so that the walls thereof continue upwardly within their respective inside walls 10 and to the fold 16 (see FIGS. 2a through 2d).

The fold 16 is formed by bending the tube form inwardly at bottom dead center thereof for collapse along the center plane of symmetry. Simultaneously with this collapse the lower extremities 21 and 22 of the side sections 14 and 15 are also inwardly bent as above described. In practice, collapse of the tube form is preferred in a multiplicity of steps, in order to conform gradually to the changing configuration of the tube form and without elongation of its cross-sectional configuration. However, it is to be understood that collapse as thus far described can be accomplished in a single step, for example, in small diameter tubing. As shown, however, there are four steps of collapse along the center line a of symmetry, and each of which has back-up against the top section 12, it being the bottom section 13 that is deformed.

Figure 2A:
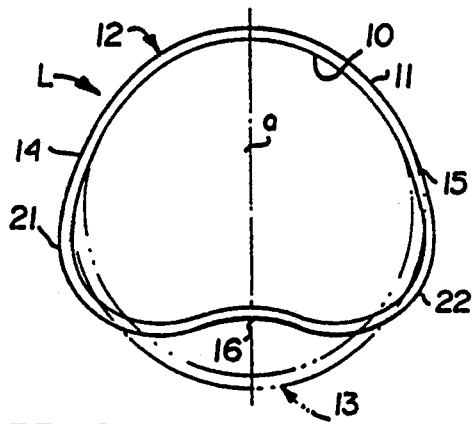
FIGS. 2a, 2b, 2c, 2d and 2e are sectional views of the extruded pipe liner in its sequential stages of deformation, and showing in phantom line the cylindrical configuration of the finished liner for comparison of the deformation in each figure.
Figure 2B:
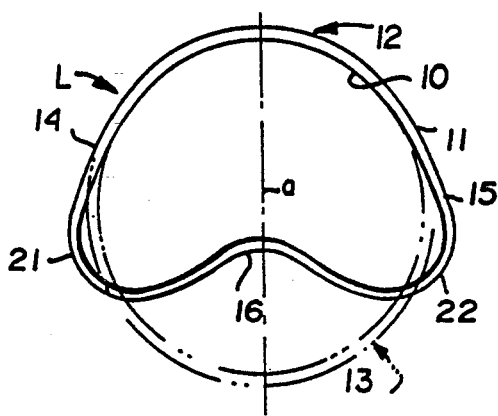
Figure 2C:
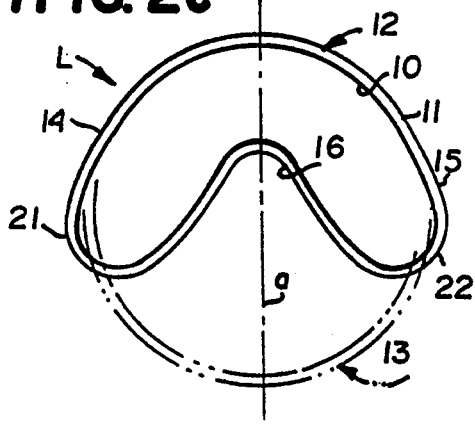
Figure 2D:
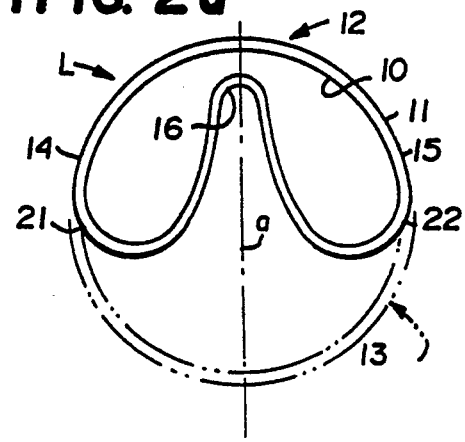

The first step of collapse shown in FIG. 2a initiates the fold 16 by bending and commences to bend the lower extremities 21 and 22. The succeeding three steps of FIGS. 2b and 2c and 2d progressively and increasingly bend and move the fold 16 closer to the inside wall 10 at the top dead center of the tube form and simultaneously increasingly and progressively bend and move the lower extremities 21 and 22 upwardly as shown. Thus, the tubular cross-section is reduced in its sectional configuration.

Figure 2E:
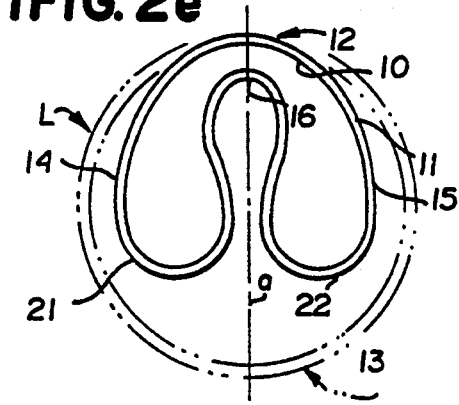

Referring now to FIG. 2e of the drawings, a final step of collapse is performed by bending the opposite side sections 14 and 15 inwardly toward the center plane of symmetry, in order to reduce the arcuate configuration of said two side sections and so that they occur within the radius or outside diameter of the initial tube form, and so as to clear within the inside diameter of the pipe line into which the ultimate pipe liner L is inserted. A feature of this final collapsing step is bringing together the two lower extremities 21 and 22 into juxtaposed relation to the center plane of symmetry, and preferably closer together than the continuing tube walls upstanding therefrom to the bends of fold 16.

Referring now to the preferred form of apparatus for deforming a continuously extruded tube form of plastic material, see FIG. 3 and the following sectional views FIGS. 4 through 9. It will be observed that there are five collapsing steps performed thereby, four incrementally progressive steps of folding the bottom section 13 of the tube form upwardly along the center plane of symmetry, and a fifth step of laterally inward collapse. Each and all of these five steps involves bending, and is essentially if not completely devoid of stretching or elongation of the tube wall of the pipe liner L, in its transverse cross-section. Each step of collapse is performed by forming means, preferably in the form of shaping rollers R1, R2, R3 and R4, followed by shaping rollers S1 and S2. It is these rollers which increasingly and progressively collapse the extruded tube form. In practice, the shaping rollers R1–R4 are lowermost, there being back-up rollers B1, B2 and B3 to support the tube form as it is impressed upon by the said rollers R1–R4. As shown, the rollers R1–R4 and B1–B3 are on spaced and parallel horizontally disposed and transverse axes.

Back-up roller B1 is disposed over the shaping roller R1 (see FIG. 4) and is characterized by its concaved spool-shape 25 at the center plane of symmetry and conforming to the substantially semi-circular back-up section 12 of the tube form. Back-up roller B1 has opposite flaring side flanges that embrace the initial formation of the side sections 14 and 15 of the tube form.

Shaping roller R1 (see FIG. 4) is characterized by its convex fold initiating and shaping perimeter 27 at the center plane of symmetry to depress the tube form wall upwardly at bottom dead center. Shaping roller R1 has opposite concaved side flanges 28 that embrace the initial formation of the lower extremities 21 and 22 of the side sections 14 and 15. The perimeters of roller flanges 26 and 28 are closely related so as to capture the tube form therebetween.

Back-up roller B2 is disposed over and intermediate shaping rollers R2 and R3 (see FIG. 3) and is characterized by its concaved spool shape 35 at the center plane of symmetry and conforming to the substantially semi-circular back-up section 12 of the tube form. Back-up roller B2 has opposite flaring flanges 36, to a lesser extent than that of roller B1, to embrace the formation of the side sections and 15 of the tube form.

Shaping roller R2 (see FIG. 5) is characterized by its convex fold shaping perimeter 37 at the center plane of symmetry to further shape the tube form wall upwardly along said plane of symmetry. Shaping roller R2 has opposite concaved side flanges 38 that embrace the lower extremities 21 and 22 of the side sections 14 and 15. The perimeters of roller flanges 36 and 38 are somewhat spaced and guide the tube form therebetween.

Shaping roller R3 (see FIG. 6) is characterized by its convex fold shaping perimeter 47 at the center plane of symmetry to further shape the tube form wall upwardly along said plane of symmetry. Shaping roller R3 has opposite concaved side flanges 48, of lesser extent than roller R2, that embrace the lower extremities 21 and 22 of the side sections 14 and 15. The perimeters of roller flanges 36 and 48 are somewhat spaced and guide the tube form therebetween.

Back-up roller B3 (see FIG. 7) is disposed over shaping roller R4 and is characterized by its concaved spool-shape 55 at the center plane of symmetry and conforming to the substantially semi-circular back-up section 12 of the tube form. Back-up roller B3 has minimized side flanges 56 that embrace the side sections 14 and 15 of the tube form.

Shaping roller R4 (see FIG. 7) is characterized by its most sharply convexed fold shaping perimeter 57 at the center plane of symmetry to still further shape the tube form wall along said plane of symmetry. Shaping roller R4 has opposite concaved side flanges 58, of still lesser extent than roller R3, that embrace the lower extremities 21 and 22 of the side sections 14 and 15. The perimeters of roller flanges 56 and 58 are closely related so as to capture and guide the tube form therebetween.

The fifth and final collapsing step is performed by a pair of laterally positioned shaping rollers S1 and S2 disposed at opposite sides of the tube form as it emanates from shaping roller R4 (see FIGS. 8 and 9). Rollers S1 and S2 are to reduce the arcuate cross-section of back-up section 12 of the tube form, as shown. Accordingly, the rollers S1 and S2 are disposed on spaced and parallel vertical axes and are characterized by a concaved spool shape 60 of curvilinear configuration increasing in curvature from top dead center, each roller, from the initial full radius of the tube form to the smaller radius of the lower extremities 21 and 22. The rollers S1 and S2 have top and bottom flanges 61 and 62 which are peripherally juxtaposed so as to completely capture the finally collapsed and deformed tube form, thereby establishing the product pipe liner L.

In accordance with this invention, and as best illustrated in FIGS. 8 and 9 of the drawings, the tube form of pipe liner L is finally collapsed onto a rail R disposed between the shaping rollers S1 and S2. The rail R is of a cross-sectional configuration to conform with the inside walls of the side sections 14 and 15 and of the lower extremities 21 and 22. Accordingly, and as clearly shown, the final cross-sectional configuration of the pipe liner L is established as required. In practice, the rail R has sliding engagement with the tube form and is of substantial longitudinal extent so as to enable a reduction in temperature and firming up while being held in the required cross-sectional configuration. Note particularly the hourglass cross-section of the rail R that accommodates the aforementioned collapsing of the lower extremities 21 and 22, bringing them closer together in relation to the center plane of symmetry than the upstanding inner walls extending to the bends of fold 16.

From the foregoing, it will be observed that the shaping of the tube form is gradual and progressive (see FIGS. 3 and 9) and from FIG. 1, it will be observed that the temperature control is involved, and the preferred material involved is a thermoplastic. Accordingly, and as best illustrated in FIG. 3 of the drawings, there are water nozzles 70 that dispense tempered water so as to maintain the temperature of, for example 160° F. in order to soften the plastic material and to ensure its bending properties. Nozzles 70 disseminate tempered water into the area of the shaping rollers R1 through R4 and S1 and S2. Thus, the tube form is made plastic so as to be collapsed and bent into the desired deformed condition. Following the final collapsing of the tube form and its sliding engagement on the rail R, the shape enabling temperature of the plastic tube form is reduced to ambient by water nozzles 71 that dispense tempered water at lower temperature so as to cool the finished pipe liner L to, for example, 70° F., all as shown in FIGS. 1 and 3 of the drawings. As shown in FIG. 3, the tempered water is collected in a sump or pan 72 for its recirculation as shown in FIG. 1. The cooling means C2 reduces the tube form to ambient temperature on or passing into delivery from rail R.

As shown in FIG. 3 of the drawings, the rollers B1–B3, R1–R4 and S1 and S2 are free to turn on bearings 73 and thereby enable forward motion of the tube form through the apparatus as described. However, as thin-walled large diameter pipe liners L are processed, it becomes necessary with some materials to assist movement of the tube form therethrough. Accordingly, torque means M in the form of motors M, electrical or hydraulic, provide the assist required (see FIG. 4). It is to be understood that anti-friction bearings 73 are provided with shafting 74, all as is shown throughout the drawings.

From the foregoing, it will be understood that a tubular pipe liner L is provided that is reduced in cross-sectional configuration so as to be readily inserted into pipe lines and then reformed to its initially extruded cross-sectional configuration, whereby it properly fits into the pipe line for which it is designed, all as differing circumstances require.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for producing a deformed pipe liner from an extruded tubular cross-section for insertion into a pipe line and reformation substantially to said extruded tubular cross-section, comprising the steps of:
   (a) extruding plastic material at a raised temperature into an initial elongated tubular cross-section having a predetermined outside diameter and an elongated axis;
   (b) collapsing the tubular cross-section, while maintaining the tubular cross-section at a reduced shape enabling deformation temperature above ambient temperature and below said raised temperature, by depressing one side thereof generally diametrically toward an opposite side thereof and toward said axis along a plane of bilateral symmetry on opposite sides of which side sections of the tubular cross-section bend into double-wall configurations;

(c) during collapsing, backing the opposite side of the tubular cross-section along the plane of bilateral symmetry, thereby reducing the cross-sectional configuration of said tubular cross-section for insertion into the pipe line and reformation therein substantially to its initially extruded tubular cross-section;

(d) disposing a rail along the plane of bilateral symmetry inwardly of the distal ends of said side sections to maintain the liner in the collapsed cross-section; and (e) reducing the temperature of the collapsed cross-section about the rail;

whereby, as a result of carrying out steps (b)–(e), the collapsed cross-section is maintained solely by the plastic material of the liner.

2. A method as set forth in claim 1, wherein the step of collapsing the tubular cross-section includes folding the one side progressively toward the opposite side, thereby progressively dimensionally reducing the tubular cross-section.

3. A method as set forth in claim 1, wherein the plastic material is a thermosetting polyethylene and wherein the step of extruding is accomplished at a temperature of about 250° F. to 300° F.

4. A method as set forth in claim 1, including displacing the opposite side sections of said double-wall configurations laterally toward the plane of bilateral symmetry.

5. A method as set forth in claim 4, wherein collapsing the tubular cross-section includes folding the one side progressively toward the opposite side, thereby progressively dimensionally reducing the tubular cross-section, and progressively displacing said opposite side sections toward one another toward the plane of bilateral symmetry.

6. A method according to claim 1, wherein collapsing the tubular cross-section includes folding the one side and locating the fold on the side of the axis closest to the opposite side of the tubular cross-section.

7. A method for producing a deformed pipe liner from a tubular cross-section formed of plastic material for insertion into a pipe line and reformation substantially to said tubular cross-section, comprising the steps of:

(a) collapsing the tubular cross-section, while maintaining the tubular cross-section at a shape enabling deformation temperature above ambient temperature, by depressing one side thereof generally diametrically toward an opposite side thereof and toward said axis along a plane of bilateral symmetry on opposite sides of which side sections of the tubular cross-section bend into double-wall configurations;

(b) during collapsing, backing the opposite side of the tubular cross-section along the plane of bilateral symmetry and displacing the opposite side sections of said double-wall configurations laterally toward the plane of bilateral symmetry, thereby reducing the cross-sectional configuration of said tubular cross-section for insertion into the pipe line and reformation therein substantially to its initially tubular cross-section;

(c) disposing a rail along the plane of bilateral symmetry inwardly of the distal ends of said side sections to maintain the liner in the collapsed cross-section; and (d) reducing the temperature of the collapsed cross-section about the rail;

whereby, as a result of steps (a)–(d), the collapsed cross-section is maintained solely by the plastic material of the liner.

8. A method as set forth in claim 7, wherein the step of collapsing the tubular cross-section includes folding the one side progressively toward the opposite side thereby progressively dimensionally reducing the tubular cross-section.

9. A method as set forth in claim 7 wherein the step of collapsing the tubular cross-section is at a temperature to prevent elongation of the plastic material.

10. A method as set forth in claim 7, wherein the step of collapsing the tubular cross-section includes folding the one side progressively toward the opposite side, thereby progressively dimensionally reducing the tubular cross-section, and progressively displacing said opposite side sections toward one another toward the plane of bilateral symmetry.

11. A method as set forth in claim 10, wherein the step of collapsing the tubular cross-section and displacing the side sections is accomplished at a temperature to prevent elongation of the plastic material.

12. A method according to claim 7, wherein the step of collapsing the tubular cross-section includes folding the one side and locating the fold on the side of the axis closest to the opposite side of the tubular cross-section.

13. An apparatus for producing a deformed pipe liner from an extruded tubular cross-section of plastic material comprising:

at least one rotatable back-up roller disposed on an axis parallel to an axis of, and generally in opposition to, at least one rotatable shaping roller;

the back-up roller having a curved concave spool-shaped periphery centered at a plane of bilateral symmetry and adapted to engage a back-up portion of the tubular cross-section;

the shaping roller having a periphery non-complementary in shape to the periphery of said back-up roller and including a curved convex fold initiating and fold shaping peripheral surface at said plane of bilateral symmetry so that when said tubular cross-section passes generally between said back-up and shaping rollers, a deformable portion of the tubular cross-section is depressed diametrically toward the back-up portion thereof and along the plane of bilateral symmetry, so that opposite side sections of the tubular cross-section bend into double-wall configurations with a fold thereof juxtaposed to said opposite back-up portion of the tubular cross-section;

such that the cross-sectional configuration of the tubular cross-section is altered and reduced; and a rail disposed generally along said plane of bilateral symmetry downstream of said back-up and shaping rollers and between said side sections.

14. An apparatus according to claim 13 including means for applying heat to the pipe liner as the back-up and shaping roller deform the pipe liner to its reduced cross-sectional configuration.

15. An apparatus according to claim 14 wherein said heat applying means applies heat to the liner as the liner is disposed between said side sections.

16. A method for producing a deformed pipe liner formed of plastic material from a tubular cross-section for insertion into a pipe line and reformation substantially to said tubular cross-section, comprising the steps of:
- (a) collapsing the tubular cross-section, while maintaining the tubular cross-section at a shape enabling deformation temperature above ambient temperature, by depressing one side thereof generally diametrically toward an opposite side thereof and toward said axis along a plane of bilateral symmetry on opposite sides of which side sections of the tubular cross-section bend into double-wall configurations;
- (b) during collapsing, backing the opposite side of the tubular cross-section along the plane of bilateral symmetry and displacing the opposite side sections of said double-wall configurations laterally toward the plane of bilateral symmetry, thereby reducing the cross-sectional configuration of said tubular cross-section for insertion into the pipe line and reformation therein substantially to its initially tubular cross-section;
- (c) disposing a rail along the plane of bilateral symmetry inwardly of the distal ends of said side sections to maintain the liner in the collapsed cross-section; and
- (d) reducing the temperature of the collapsed cross-section about the rail;

whereby, as a result of steps (a)–(d), the collapsed cross-section is maintained without application of means external to the deformed pipe liner.

17. A method according to claim 16 including the step of extruding the plastic material at a raised temperature above the shape enabling deformation temperature into an initial elongated tubular cross-section having a predetermined outside diameter.

18. A method according to claim 1 wherein the steps of collapsing and backing the tubular cross-section are performed by engaging rollers against the tubular cross-section, said rail being fixed and non-rotatable, and including the further steps of advancing the liner past the rollers, engaging the liner and the fixed non-rotatable rail, and advancing the liner relative to the fixed non-rotatable rail.

19. A method according to claim 7 wherein the steps of collapsing and backing the tubular cross-section are performed by engaging rollers against the tubular cross-section, said rail being fixed and non-rotatable, and including the further steps of advancing the liner past the rollers, engaging the liner and the fixed non-rotatable rail, and advancing the liner relative to the fixed non-rotatable rail.

20. A method according to claim 16 wherein the steps of collapsing and backing the tubular cross-section are performed by engaging rollers against the tubular cross-section, said rail being fixed and non-rotatable, and including the further steps of advancing the liner past the rollers, engaging the liner and the fixed non-rotatable rail, and advancing the liner relative to the fixed non-rotatable rail.

* * * * *